United States Patent
Akkarakaran et al.

(10) Patent No.: US 11,431,446 B2
(45) Date of Patent: Aug. 30, 2022

(54) ACK RETRANSMISSION PROCESSING AND MAC-CE ACTIVATION

(71) Applicant: QUALCOMM Incorporated, San Diego, CA (US)

(72) Inventors: Sony Akkarakaran, Poway, CA (US); Jing Sun, San Diego, CA (US); Xiaoxia Zhang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 39 days.

(21) Appl. No.: 16/993,103

(22) Filed: Aug. 13, 2020

(65) Prior Publication Data

US 2021/0050959 A1 Feb. 18, 2021

Related U.S. Application Data

(60) Provisional application No. 62/888,111, filed on Aug. 16, 2019.

(51) Int. Cl.
*H04L 1/18* (2006.01)
*H04W 72/12* (2009.01)
*H04W 80/02* (2009.01)

(52) U.S. Cl.
CPC ....... *H04L 1/1854* (2013.01); *H04W 72/1289* (2013.01); *H04W 80/02* (2013.01)

(58) Field of Classification Search
CPC .. H04L 1/1854; H04W 72/1289; H04W 80/02
See application file for complete search history.

(56) References Cited

U.S. PATENT DOCUMENTS

| | | | | |
|---|---|---|---|---|
| 2005/0220145 A1* | 10/2005 | Nishibayashi | ........ | H04W 99/00 370/474 |
| 2007/0211620 A1* | 9/2007 | McBeath | .............. | H04L 1/1877 370/209 |
| 2009/0147726 A1* | 6/2009 | Tseng | .................... | H04L 1/1851 370/315 |
| 2011/0269490 A1* | 11/2011 | Earnshaw | ............. | H04L 1/0026 455/509 |
| 2017/0230971 A1* | 8/2017 | Lee | ........................ | H04L 5/0055 |
| 2018/0220345 A1* | 8/2018 | Moon | .................... | H04W 36/24 |
| 2020/0100248 A1* | 3/2020 | Kim | ...................... | H04W 76/27 |

(Continued)

FOREIGN PATENT DOCUMENTS

EP 3211813 A2 8/2017

OTHER PUBLICATIONS

International Search Report and Written Opinion—PCT/US2020/046416—ISA/EPO—dated Jan. 22, 2021.

(Continued)

*Primary Examiner* — Christopher M Crutchfield
*Assistant Examiner* — Tito Q Pham
(74) *Attorney, Agent, or Firm* — Haynes and Boone LLP

(57) ABSTRACT

A method of operating a user equipment (UE) device according to some embodiments includes receiving a transmission from a base station (gNB) that includes instructions for performing an action; attempting an ACK based on the transmission; timing performance of the action. Timing performance may be based on the transmission of the ACK, receipt of the transmission, or receipt of a retransmission request. Performance of the action is according to the timing.

21 Claims, 8 Drawing Sheets

(56) References Cited

U.S. PATENT DOCUMENTS

2021/0218538 A1* 7/2021 Myung ............. H04W 74/0808
2021/0298038 A1* 9/2021 Kang ................ H04W 72/1268

OTHER PUBLICATIONS

Qualcomm Incorporated: "CA and BWP", 3GPP Draft, 3GPP TSG RAN WG1 NR AdHoc#3, R1-1716440, CA_BWP, 3rd Generation Partnership Project (3GPP), Mobile Competence Centre, 650, Route Des Lucioles, F-06921, Sophia-Antipolis, Cedex, France, vol. RAN WG1, No. Nagoya, Japan, Sep. 18, 2017-Sep. 21, 2017,Sep. 17, 2017, XP051339895, 7 Pages, Retrieved from the Internet: URL: http://www.3gpp.org/ftp/Meetings_3GPP_SYNC/RAN1/Docs/ [retrieved on Sep. 17, 2017], Sections 1-6, 3, 4.1 and 4.2.

Qualcomm Incorporated: "Discussion on New MAC CE for MIMO," 3GPP Draft, 3GPP TSG-RAN WG2 Meeting #101, R2-1803118, 3rd Generation Partnership Project (3GPP), Mobile Competence Centre, 650, Route Des Lucioles, F-06921 Sophia-Antipolis Cedex, France, vol. RAN WG2, No. Athens, Greece, Feb. 26, 2018-Mar. 2, 2018, Feb. 16, 2018, XP051400402, pp. 1-4, Retrieved from the Internet: URL: http://www.3gpp.org/ftp/tsg%5Fran/WG2%5FRL2/ TSGR2%5F101/Docs/ [retrieved on Feb. 16, 2018] p. 3, sections 2.1,2.2 and 2.3.

Partial International Search Report—PCT/US2020/046416—ISA/ EPO—dated Nov. 23, 2020.

* cited by examiner

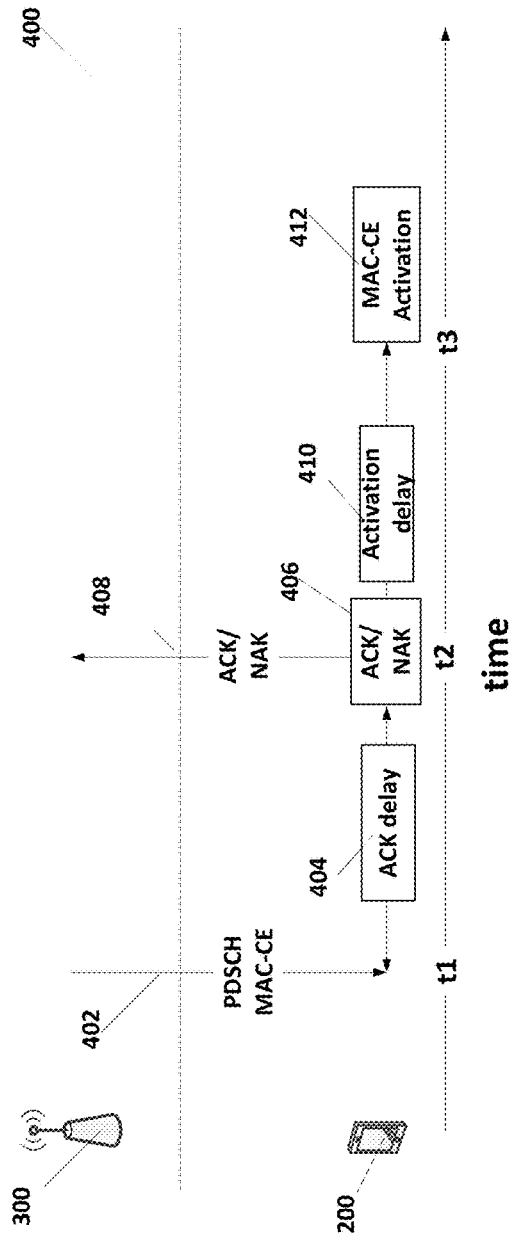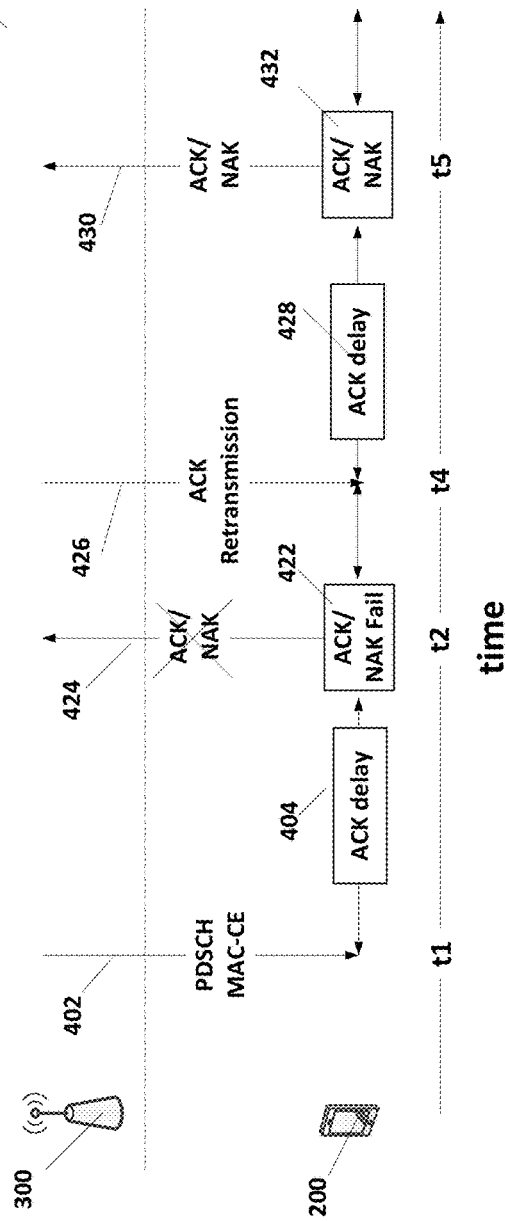

ACK RETRANSMISSION PROCESSING AND MAC-CE ACTIVATION

CROSS REFERENCE

The present application for patent claims priority to U.S. Provisional Patent Application No. 62/888,111, entitled "ACK RETRANSMISSION PROCESSING AND MAC-CE ACTIVATION," filed Aug. 16, 2019, assigned to the assignee hereof.

TECHNICAL FIELD

This application relates to wireless communication systems, and more particularly ACK retransmission processing and MAC-CE activation timing.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long-term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

One approach to avoiding collisions when communicating in a shared spectrum or an unlicensed spectrum is to use a listen-before-talk (LBT) procedure to ensure that the shared channel is clear before transmitting a signal in the shared channel. The operations or deployments of NR in an unlicensed spectrum is referred to as NR-U. In NR-U, a BS may schedule a UE for an uplink (UL) transmission in an unlicensed frequency band. The UE may perform an LBT procedure prior to the scheduled time. When the LBT is a success, the UE may proceed to transmit UL data according to the schedule. When the LBT fails, the UE may refrain from transmitting. In some instances, the LBT may pass at a later time within the scheduled period. When the LBT success is delayed into the scheduled period, the UE may transmit in the remaining time of the scheduled period by puncturing a portion of the UL data. Thus, depending on the LBT result, the UE may or may not transmit the UL data as scheduled. Additionally, the puncturing can degrade the decoding performance of the UL data at the BS.

However, when the UE receives a physical downlink shared channel (PDSCH) that contains a Media Access Control (MAC) Control Element (CE), which is executed by the UE, the timing of execution of the MAC-CE may be unclear. Consequently, there is a need to clarify the timing of execution of the MAC-CE under various operational conditions.

BRIEF SUMMARY OF SOME EXAMPLE EMBODIMENTS

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

A method of operating a user equipment (UE) device according to some embodiments includes receiving a transmission from a base station (gNB) that includes instructions for performing an action; attempting an ACK based on the transmission; timing performance of the action based on the transmission of the ACK, receipt of the transmission, or receipt of a retransmission request; and performing the action according to the timing.

In some embodiments a method of operating a user equipment (UE) device includes receiving a transmission from a base station (gNB) that includes instructions for performing an action; attempting an ACK based on the transmission; timing performance of the action dependent on whether the ACK is successfully transmitted; and performing the action according to the timing.

In some embodiments a user equipment device includes a transceiver; a communications module coupled to the transceiver to receive and transmit communications to a base station, the communications module executing instructions to receive a transmission from a base station (gNB) that includes instructions for performing an action; attempt an ACK based on the transmission; time performance of the action dependent on whether the ACK is successfully transmitted; and perform the action according to the timing.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIGS. 4A and 4B illustrates timing of execution of a MAC-CE instruction in a user equipment (UE) device.

DETAILED DESCRIPTION

Figure 1:
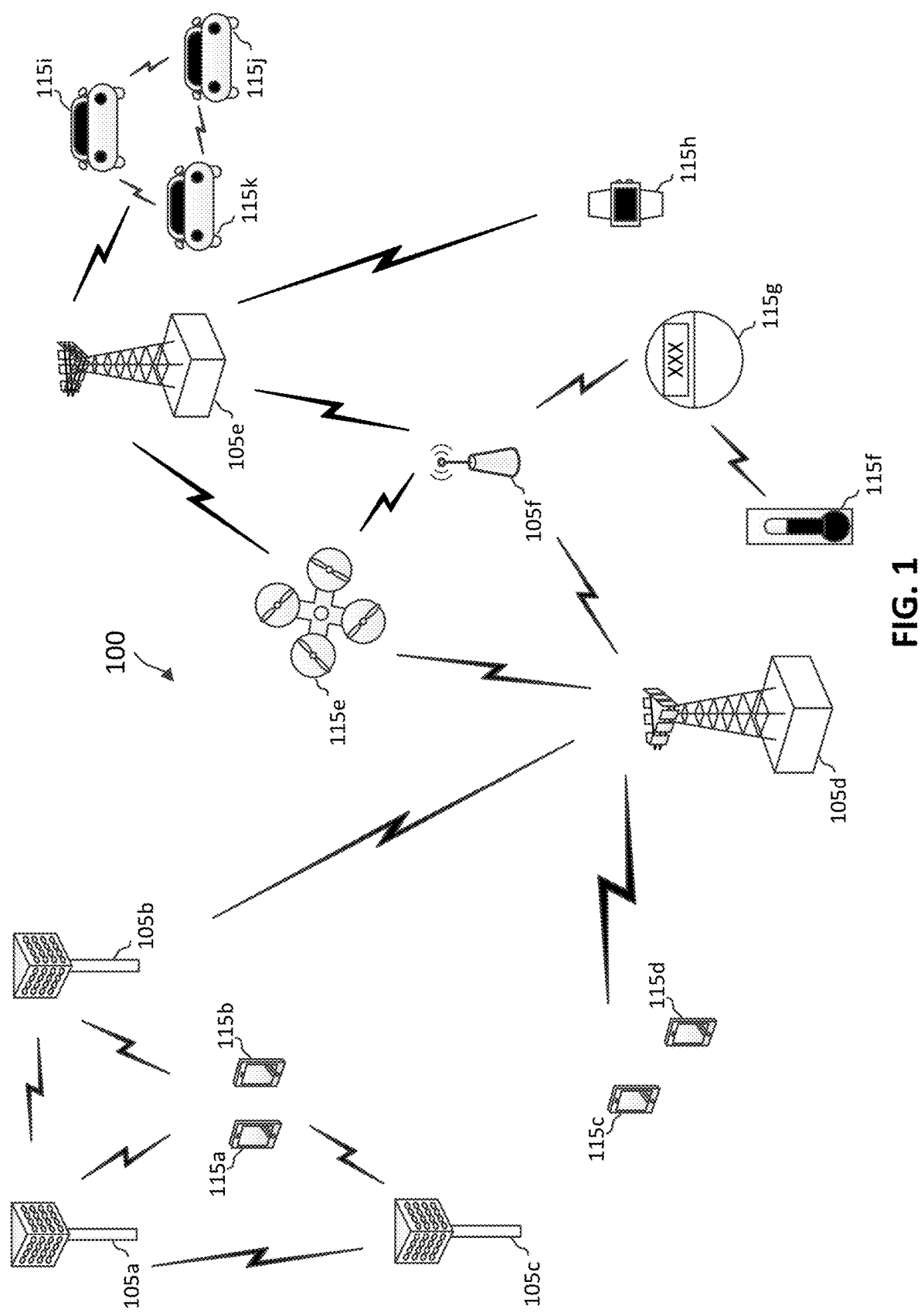
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates to timing of execution of a MAC control element (MAC-CE) or other action in a UE after receipt of a physical downlink shared channel (PDSCH) transmission with a MAC-CE instruction or instructions for other actions. In many instances, a timing is indicated for the UE to provide an ACK/NACK of the PDSCH transmission (which thus indicates whether the MAC-CE has been received). The timing information may be part of the Down Link (DL) downlink control indicator (DCI) (send in the PDSCH transmission) carrying the scheduling grant for the physical downlink control channel (PDCCH) carrying the scheduling grant for the PDSCH transmission. Alternatively, the timing information may be pre-configured by the radio resource controller (RRC) if the PDSCH transmission was on an RRC configured grant such as a semipersistent scheduling grant. The execution of the MAC-CE may occur a set time period following the ACK signal. However, embodiments of the present invention address issues that occur when the UE is unable to send the ACK signal and addresses timing of execution of the MAC-CE in the UE.

As indicated above, this disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 illustrates a wireless communication network 100 according to some embodiments of the present disclosure. The network 100 may be a 5G network. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115k are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the DL and/or UL, or desired transmission between BSs, and backhaul transmissions between BSs.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as with the small cell, the BS 105f. The macro BS 105d may also transmit multicast services which are subscribed to and received by the UEs 115c and 115d. Such multicast services may include mobile television or stream video, or may include other services for providing community information, such as weather emergencies or alerts, such as Amber alerts or gray alerts.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as in a vehicle-to-vehicle (V2V).

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

Figure 2:
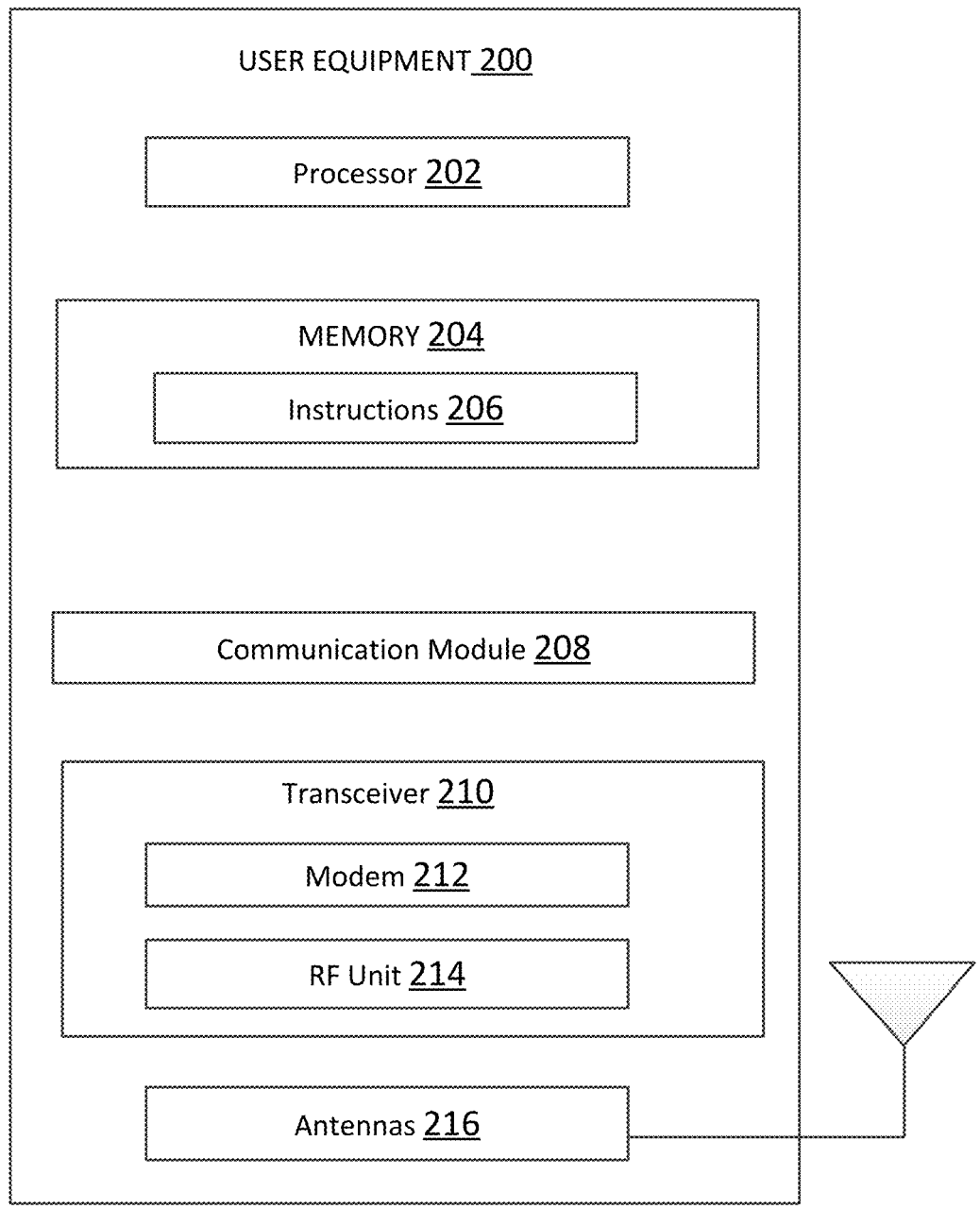
FIG. 2 is a block diagram of an example user equipment (UE) according to embodiments of the present disclosure.

FIG. 2 is a block diagram of an example UE 200 according to embodiments of the present disclosure. The UE 200 may be any of UE 115 illustrated in FIG. 1 as discussed above. As shown, the UE 200 may include a processor 202, a memory 204, a communication module 208, a transceiver 210 including a modem subsystem 212 and a radio frequency (RF) unit 214, and one or more antennas 216. These elements may be in direct or indirect communication with each other, for example via one or more buses.

The processor 202 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 202 may also be implemented as a combination of computing devices, e.g., a combination of a DSP and a microprocessor, a plurality of microprocessors, one or more microprocessors in conjunction with a DSP core, or any other such configuration.

The memory 204 may include a cache memory (e.g., a cache memory of the processor 202), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 204 includes a non-transitory computer-readable medium. The memory 204 may store instructions 206. The instructions 206 may include instructions that, when executed by the processor 202, cause the processor 202 to perform the operations described herein with reference to the UEs 115 in connection with embodiments of the present disclosure. The instructions 206 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The communication module 208 may be implemented via hardware, software, or combinations thereof. For example, the communication module 202 may be implemented as a processor, circuit, and/or instructions 206 stored in the memory 204 and executed by the processor 202.

The communications module 208 may be configured to package upload (UL) data within a predetermined frame structure or receive download (DL) data. The predetermined frame structure is set to transmit and receive data through network 100. The communication module 208 may be configured to transmit and receive data between UE 200 and a BS according to the predetermined frame structure. The predetermined frame structure can be a time division duplexing (TDD) or frequency division duplexing (FDD) structure and includes slots for uploading and downloading data. Further, listen-before-talk (LBT) protocols can be implemented such that communications module 208 listens to the physical channel prior to transmitting data.

As shown, the transceiver 210 may include the modem subsystem 212 and the RF unit 214. The transceiver 210 can be configured to communicate bi-directionally with other devices, such as the BSs 105 and/or another core network element. The modem subsystem 212 may be configured to modulate and/or encode the data from the memory 204 and/or the communication module 208 according to a modulation and coding scheme (MCS), e.g., a low-density parity check (LDPC) coding scheme, a turbo coding scheme, a convolutional coding scheme, a digital beamforming scheme, etc., and in accordance with the predetermined frame structure. The RF unit 214 may be configured to process (e.g., perform analog to digital conversion or digital to analog conversion, etc.) modulated/encoded data from the modem subsystem 212 (on outbound transmissions) or of transmissions originating from another source such as a UE or a BS 105. The RF unit 214 may be further configured to perform analog beamforming in conjunction with the digital beamforming. Although shown as integrated together in transceiver 210, the modem subsystem 212 and the RF unit 214 may be separate devices that are coupled together at the UE 200 to enable the UE 200 to communicate with other devices.

The RF unit 214 may provide the modulated and/or processed data, e.g. data packets (or, more generally, data messages that may contain one or more data packets and other information), to the antennas 216 for transmission to one or more other devices. The antennas 216 may further receive data messages transmitted from other devices. The antennas 216 may provide the received data messages for processing and/or demodulation at the transceiver 210. The antennas 216 may include multiple antennas of similar or different designs in order to sustain multiple transmission links. The RF unit 214 may configure the antennas 216.

Figure 3:
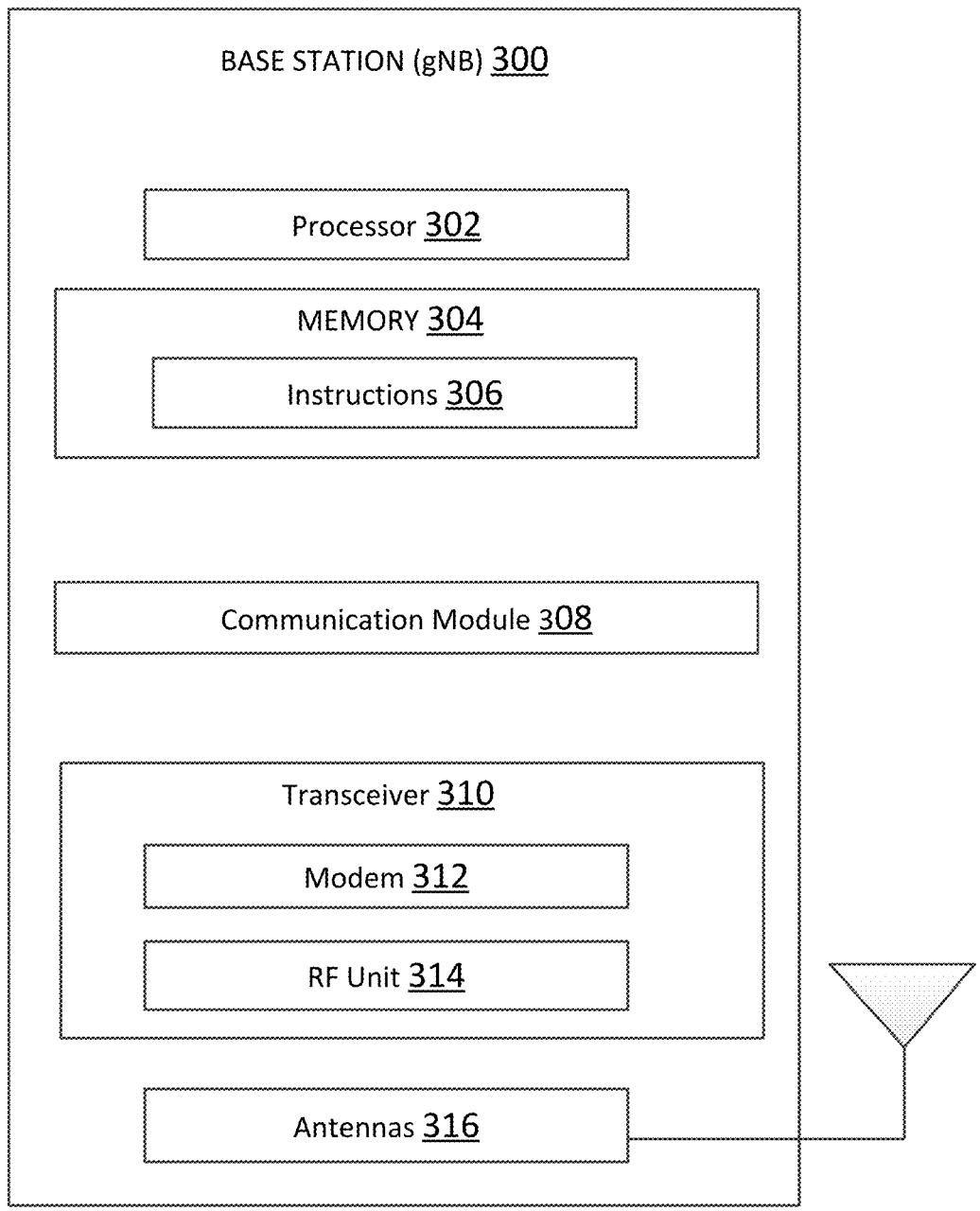
FIG. 3 is a block diagram of an example base station (BS) according to embodiments of the present disclosure.

FIG. 3 is a block diagram of an example BS (gNB) 300 according to embodiments of the present disclosure. The gNB 300 may be a BS 105 as illustrated in FIG. 1 and discussed above. As shown, gNB 300 may include a processor 302, a memory 304, a communication module 308, a transceiver 310 including a modem subsystem 312 and a RF unit 314, and one or more antennas 316. These elements may be in direct or indirect communication with each other, for example via one or more buses.

The processor 302 may have various features as a specific-type processor. For example, these may include a CPU, a DSP, an ASIC, a controller, a FPGA device, another hardware device, a firmware device, or any combination thereof configured to perform the operations described herein. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), RAM, MRAM, ROM, PROM, EPROM, EEPROM, flash memory, a solid-state memory device, one or more hard disk drives, memristor-based arrays, other forms of volatile and non-volatile memory, or a combination of different types of memory. In some embodiments, the memory 304 may include a non-transitory computer-readable medium. The memory 304 may store instructions 306. The instructions 306 may include instructions that, when executed by the processor 302, cause the processor 302 to perform operations described herein. The instructions 306 may also be referred to as code, which may be interpreted broadly to include any type of computer-readable statement(s) as discussed above with respect to FIG. 2.

Communications module 308 may be implemented via hardware, software, or combinations thereof. For example, communication module 308 may be implemented as a processor, circuit, and/or instructions 306 stored in the memory 304 and executed by the processor 302.

The communication module 308 may be configured to prepare or receive data into a predetermined frame structure or retrieve data according to a predetermined frame structure in order to send and receive data. The predetermined frame structure can be a time division duplexing (TDD) or frequency division duplexing (FDD) structure and includes slots for uploading and downloading data. Further, listen-before-talk (LBT) protocols can be implemented such that communications module 308 listens to the physical channel prior to transmitting data.

As shown, the transceiver 310 may include the modem subsystem 312 and the RF unit 314. The transceiver 310 can be configured to communicate bi-directionally with other devices, such as the UE 200 (or any of UE 115s) and/or another core network element. The modem subsystem 312 may be configured to modulate and/or encode data according to a MCS, e.g., a LDPC coding scheme, a turbo coding scheme, a convolutional coding scheme, a digital beamforming scheme, etc. The RF unit 314 may be configured to process (e.g., perform analog to digital conversion or digital to analog conversion, etc.) modulated/encoded data from the modem subsystem 312 (on outbound transmissions) or of transmissions originating from another source such as a UE 200 or another BS 105 as illustrated in FIG. 1. The RF unit 314 may be further configured to perform analog beamforming in conjunction with the digital beamforming. Although shown as integrated together in transceiver 310, the modem subsystem 312 and/or the RF unit 314 may be separate devices that are coupled together at the gNB 300 to enable the gNB 300 to communicate with other devices.

The RF unit 314 may provide the modulated and/or processed data, e.g. data packets (or, more generally, data messages that may contain one or more data packets and other information), to the antennas 316 for transmission to one or more other devices. This may include, for example, transmission of information to complete attachment to a network and communication with a camped UE 115 (UE 200) according to embodiments of the present disclosure. The antennas 316 may further receive data messages transmitted from other devices and provide the received data messages for processing and/or demodulation at the transceiver 310. The antennas 316 may include multiple antennas of similar or different designs in order to sustain multiple transmission links.

With reference again to FIG. 1, in some embodiments, the BSs 105 can assign or schedule transmission resources (e.g., in the form of time-frequency resource blocks (RB)) for DL and UL transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, 10 slots per frame. Each slot may be further divided into mini-slots. In a FDD mode, simultaneous UL and DL transmissions may occur in different frequency bands. For example, each subframe includes an UL subframe in an UL frequency band and a DL subframe in a DL frequency band. In a TDD mode, UL and DL transmissions occur at different time periods using the same frequency band. For example, a subset of the slots (e.g., DL slots) in a radio frame may be used for DL transmissions and another subset of the slots (e.g., UL slots) in the radio frame may be used for UL transmissions.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a physical DL control channel (PDCCH). The BS 105 may transmit a DL communication signal to the UE 115 via a physical DL shared channel (PDSCH) according to a DL scheduling grant. The UE 115 may transmit an UL communication signal to the BS 105 via a physical UL shared channel (PUSCH) and/or physical UL control channel (PUCCH) according to an UL scheduling grant.

With reference to FIGS. 2 and 3, UE 200 and gNB 300 communicate with one another through network 100 as illustrated in FIG. 1. Communications module 208 of UE 200 and communications module 308 of BS 300 exchange data with one another by exchanging MAC packets. A MAC packet includes a MAC header and a MAC payload. The MAC packet can further include Control Elements (CEs) that control aspects of the communication and/or provide requests for actions that are to be executed by the recipient of the MAC-CE, for example UE 200. A current list of MAC-CEs appropriate for the 5G standard, for example, can be found in the standard 3GPP 38.321 Section 6.1.3. This disclosure is directed to those MAC-CEs that would be transmitted from BS 300 to UE 200 and the actions directed by the MAC-CEs executed by UE 200. In general, when BS 300 transmits a MAC-CE to UE 200 it is important that BS 300 receives notification of receipt of the MAC-CE, which often occurs with an ACK/NAK transmission from UE 200 to BS 300.

Embodiments of the present invention provide certainty in execution of the action in UE 200 to BS 300. A method of operating a user equipment (UE) device, receiving a transmission from a base station (gNB) that includes instructions for performing an action (for example in a PDSCH MAC-CE communication from the base station). Even if an attempted ACK based on the transmission fails, timing performance of the action is determined at the base station. The action is then performed according to the timing. In accordance with some embodiments, the timing can be based on successful transmission of the ACK, receipt of the transmission, or receipt of a retransmission request.

As was discussed above, UE 200 can be any of UE 115 illustrated in FIG. 1. Additionally, BS 300 can be any of BS 105 illustrated in FIG. 1.

FIG. 4A illustrates expected communications 400 between base station (gNB) 300 and UE 200. In particular FIG. 4A illustrates operation of UE 200 after receipt of a MAC-CE command from base station gNB 300. As illustrated in FIG. 4A, UE 200 receives a PDSCH with a MAC-CE instruction 402 at time t1. The PDSCH MAC-CE typically includes parameters for processing the MAC-CE in UE 200, including delay times for providing an ACK/NAK signal and timing for execution of the commands in the MAC-CE. In particular, gNB 300 provides in the PDSCH MAC-CE instruction timing scheduling in the Download Control Indicator (DCI) the scheduling for an ACK on the PUCCH.

As illustrated in FIG. 4A, from time t1 UE 200 executes an ACK delay 404. ACK delay 404 can indicate time slot in which UE 200 can provide an ACK in response to receipt of the PDSCH MAC-CE, as shown in FIG. 1 at time t2 in slot n. As further illustrated in FIG. 4A, during transmission of a PUCCH ACK/NAK, UE 200 performs a listen-before-talk (LBT) process. If the PUCCH is available, then UE 200 transmits an ACK/NAK signal 408 at the time slot n identified as time t2.

As is further illustrated in FIG. 4A, UE 200 then executes the received MAC-CE instruction at time t3, which in FIG. 4A is shown as N slots after transmission of the ACK at time t2. As such, UE 200 executes an activation delay 410 from the time t2 when ACK/NAK 408 is transmitted where ACK/NAK 408 is an affirmative ACK. Activation delay 410 can also be determined by PDSCH MAC-CE 402 as a particular number of time slots, N time slots, after transmission of an ACK in ACK/NAK 408. Consequently, the MAC-CE command is activated in MAC-CE activation 412 starting at slot n+N from the slot in which the PDSCH is recited in UE 104. IF a NAK signal is sent in ACK/NAK 408, then the MAC-CE command is not activated.

FIG. 4B illustrates the issue that happens if the ACK that was to be transmitted in the nth slot at time t2 fails to be transmitted. This failure may occur because of a listen-before talk (LBT) failure that prevents transmission of the ACK in ACK/NAK fail 422 or there may be other reasons why the ACK/NAK transmission 424 failed to be transmitted. It should be noted that, for an M-slot aggregated ACK transmission, the LBT process may be accomplished once every p slots where 1≤p≤M and consequently when an opportunity to transmit the ACK is missed, it may not be reperformed for some time.

In such a case where ACK/NAK transmission has filed in step 422, an ACK/NAK re-transmission (reTX) request 426 may be received from gNB 300 at some time t4 later than time t2. reTX request 426 provides for another ACK/NAK time slot at time t5, which again may be n1 time slots following receipt of the reTX request 426. As illustrated, UE 200 then executes an ACK delay 428 from time t4 time slot t5. Further, UE 200 provides another ACK/NK transmission 430 generated by executing ACK/NAK 432, which in this example does not fail.

Execution of the MAC-CE instructions can then occur. However, in situations of failure to transmit the ACK at time t2, the time when the MAC-CE instruction is activated by UE 200 is uncertain. In many situations, it is important that gNB 300 knows when UE 200 activates the MAC-CE instruction received in PDSCH MAC-CE instruction 402. Consequently, embodiments of the present invention provide for clarity as to when UE 200 executes the MAC-CE instruction 402.

Figure 5:
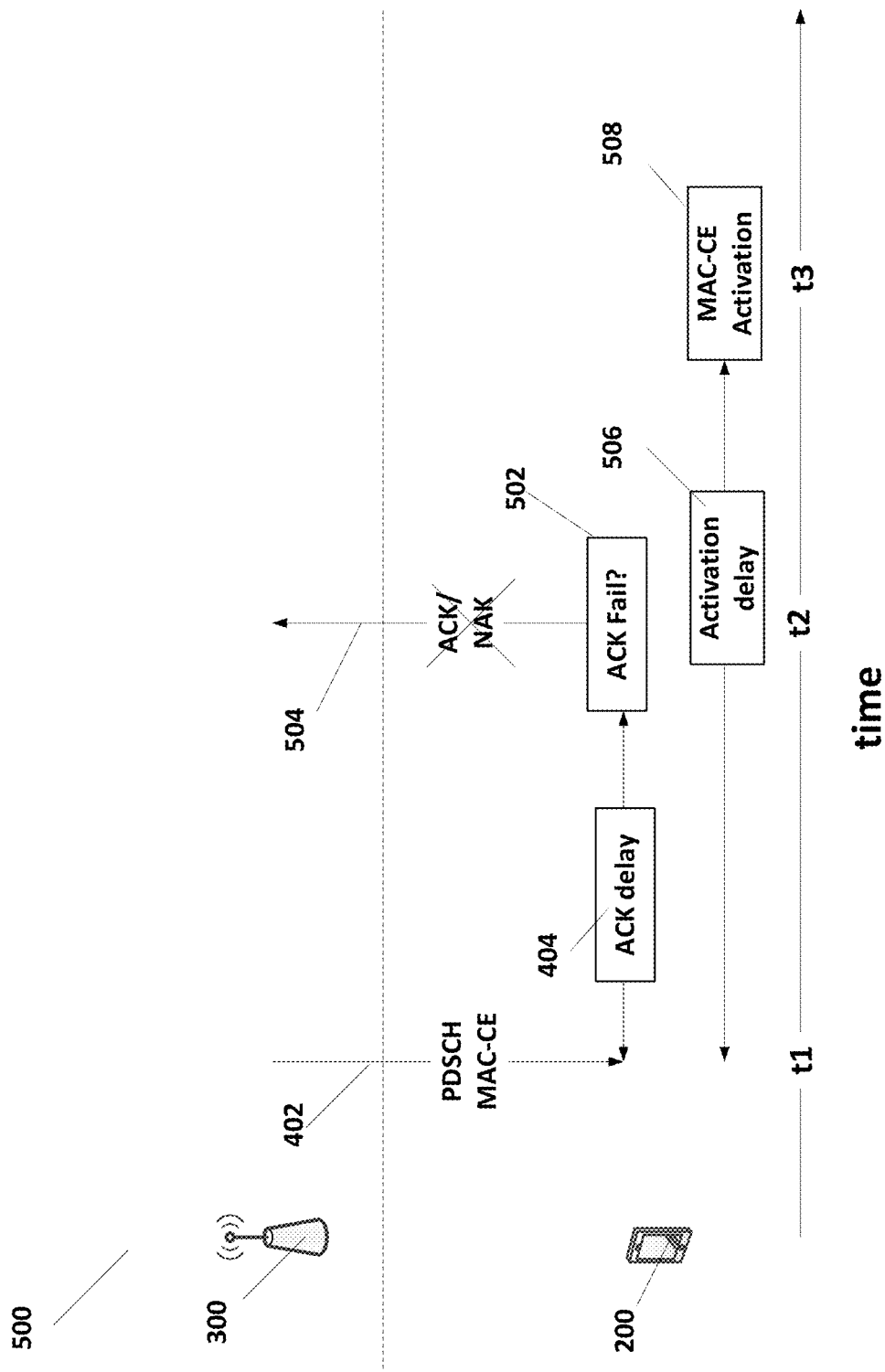
FIG. 5 illustrates an embodiment of timing of execution of a MAC-CE instruction in a UE device.

FIG. 5 illustrates a timing process 500 according to some embodiments that solves the uncertainty in the execution of the MAC-CE instructions transmitted by gNB 300. In the embodiment illustrated in FIG. 5, UE 200 activates the MAC-CE in MAC-CE Activation 508 after activation delay 506 with a set delay time N slots after receiving the PDSCH with the MAC-CE instruction 402 communication from gNB 300, regardless of any ACK transmission or retransmission times. Consequently, MAC-CE activation 508 occurs after a set activation delay 506 from receipt of PDSCH MAC-CE communication 402. The value of delay time N in activation delay 506 can be preset for such communications or can be sent in the PDSCH MAC-CE communication 402.

As is further illustrated in FIG. 5, after an ACK delay 404 of n slots from receipt of PDSCH MAC-CE communication 402 an ACK/NAK communication 504 is attempted in ACK 502 at time t2. In the example illustrated in FIG. 5, this attempt failed resulting in no ACK/NAK communications 504 being sent. This, however, does not affect the actual execution of the MAC-CE instructions in MAC-CE activation 508. The value of delay time n in ACK delay 404 can be preset for such communications or can be sent in the PDSCH MAC-CE communication 402.

In the embodiment illustrated in FIG. 5, the time t3 can be set, for example by the delay time N included in the PDSCH MAC-CE communication 402 received at time t1, independent of whether the scheduled ACK transmission 504 at time t2 was successful. In another example, t3 can be set by the DL DCI carrying the grant for the PDSCH, or if there was no such DCI (e.g., because the PDSCH was RRC configured), then based on a 'virtual DCI grant' defined as a fixed time offset prior to the PDSCH.

The embodiment illustrated in FIG. 5 represents a simple scheme that is independent of Ack LBT outcome in ACK 502 or any other factor which can cause UE 200 to fail to send the ACK transmission 504. However, in the embodiment illustrated in FIG. 5, gNB 300 may not know if UE 200 actually received the PDSCH MAC-CE instruction 402 if ACK/NAK is scheduled/decodable at gNB 300 only after the N slots ending at time t3. This effect can be mitigated with large N, so that ACK/NAK communication 504 usually arrives by then after the failure at ACK Fail 502 (which is still not guaranteed, due to LBT failure in later attempts). Consequently, the embodiment illustrated in FIG. 5 may be used for certain 'non critical' MAC-CEs where any resulting misalignment between gNB 300 and UE 200 on the precise activation time may not result in serious consequences. Further, this approach may not adhere to the timing of the ACK signal that is consistent with Rel. 15 of the development of standards for 5G from the "3rd Generation Partnership Project" (3GPP) organization.

Figure 6:
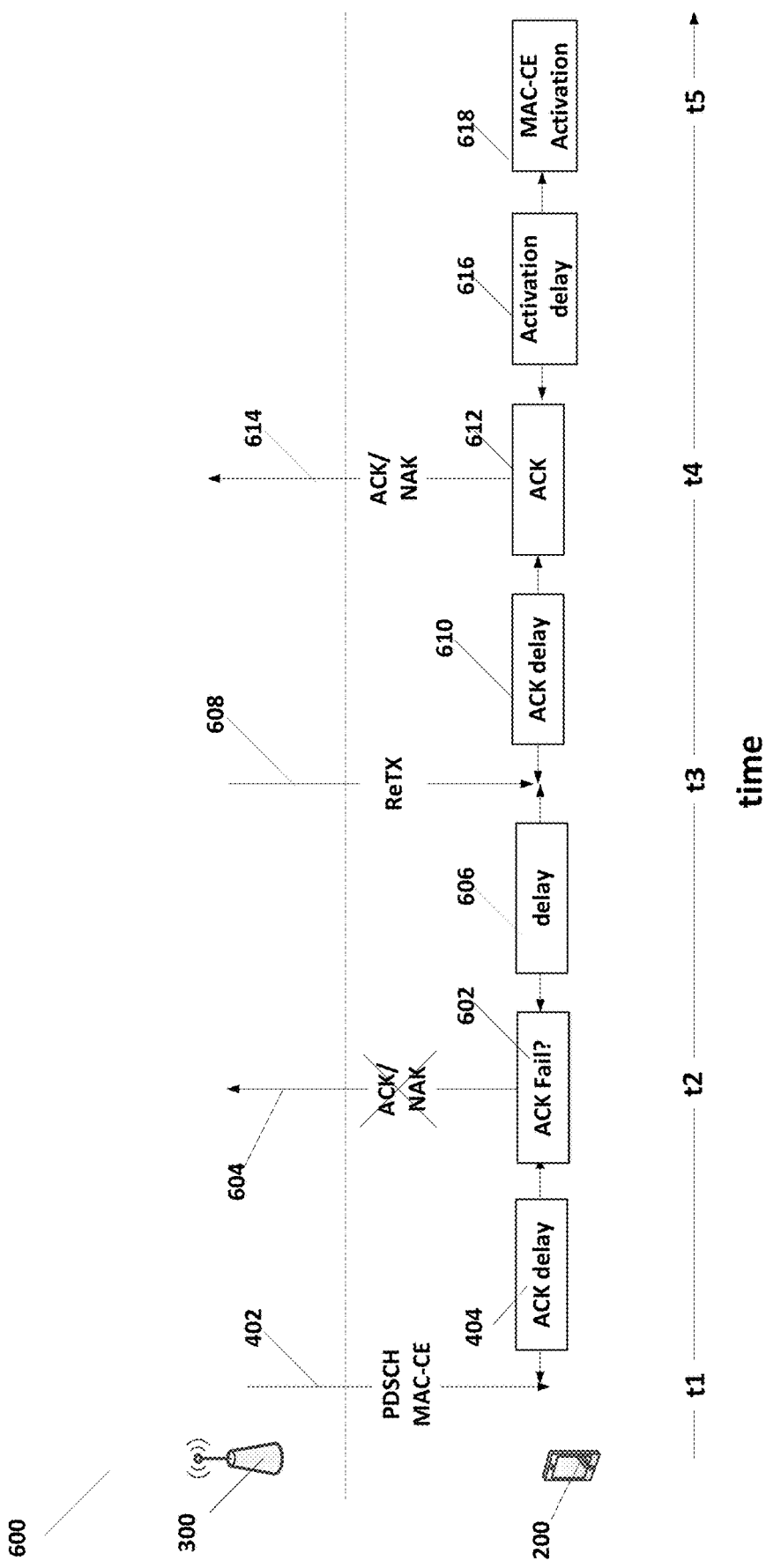
FIG. 6 illustrates another embodiment for timing of execution of a MAC-CE instruction in a UE device.

FIG. 6 illustrates another embodiment of a timing process 600 where activation of the MAC-CE occurs a set time, for example N time slots, after a successful ACK transmission, which also removes the uncertainty with regard to activation. As illustrated in FIG. 6, UE 200 receives a PDSCH with MAC-CE instruction 402 from gNB 300 at time t1. After an ACK delay 404, UE 200 attempts to send an ACK/NAK communication 600 at time t2 (for example n slots following receipt of instruction 402) in ACK 602. As illustrated in FIG. 6, UE 200 fails to send the ACK at the designated time t2 in ACK step 602. As discussed above, a LBT process in ACK step 602 may have failed or some other fault has occurred. After another delay 606, at a later time t3, gNB 300 submits a re-transmission (ReTX) instruction 608. After another ACK delay 610, UE 200 may in ACK step 612 attempt ACK/NAK communication 614. In this example, ACK step 612 was successful and ACK/NAK communication 614 was successfully sent to gNB 300 by UE 200 at time t4. Again, ACK delay 610 may be n slots following receipt of ReTX 608 where n is predetermined or set in ReTX 608. Successful transmission of ACK/NAK communication delay 614 results MAC-CE activation 618 after activation delay 616. Consequently, UE 200 activates the MAC-CE from MAC- CE instruction 402 at time t5 (which may be N time slots after the successful ACK transmission in communication 614).

In some embodiments, if the unsuccessful ACK/NAK communication 604 was dropped due to LBT failure, it does not count as a successful ACK communication. For an M-slot aggregated ACK, it may be counted as dropped if the number or percentage of dropped ACK-slots is greater than a particular threshold. This threshold can be set between the extremes from if any slot was dropped to if all slots were dropped. Setting of the threshold may be an operational parameter for UE 200 to determine ACK communication failure in ACK step 602.

For multislot ACK (PUCCH or PUSCH slot aggregation), the value of n in ACK delay 404 or ACK delay 610 refers to the last slot for ACK in the aggregation. It should be noted that aggregated slots for the ACK need not be contiguous—slot positions just need to be known ahead of time. If this threshold rule passes, activation time t5 could still be based on N slots after the last scheduled slot for Ack, regardless of which slots were dropped (as gNB 300 may not know which slots were dropped).

Figure 7:
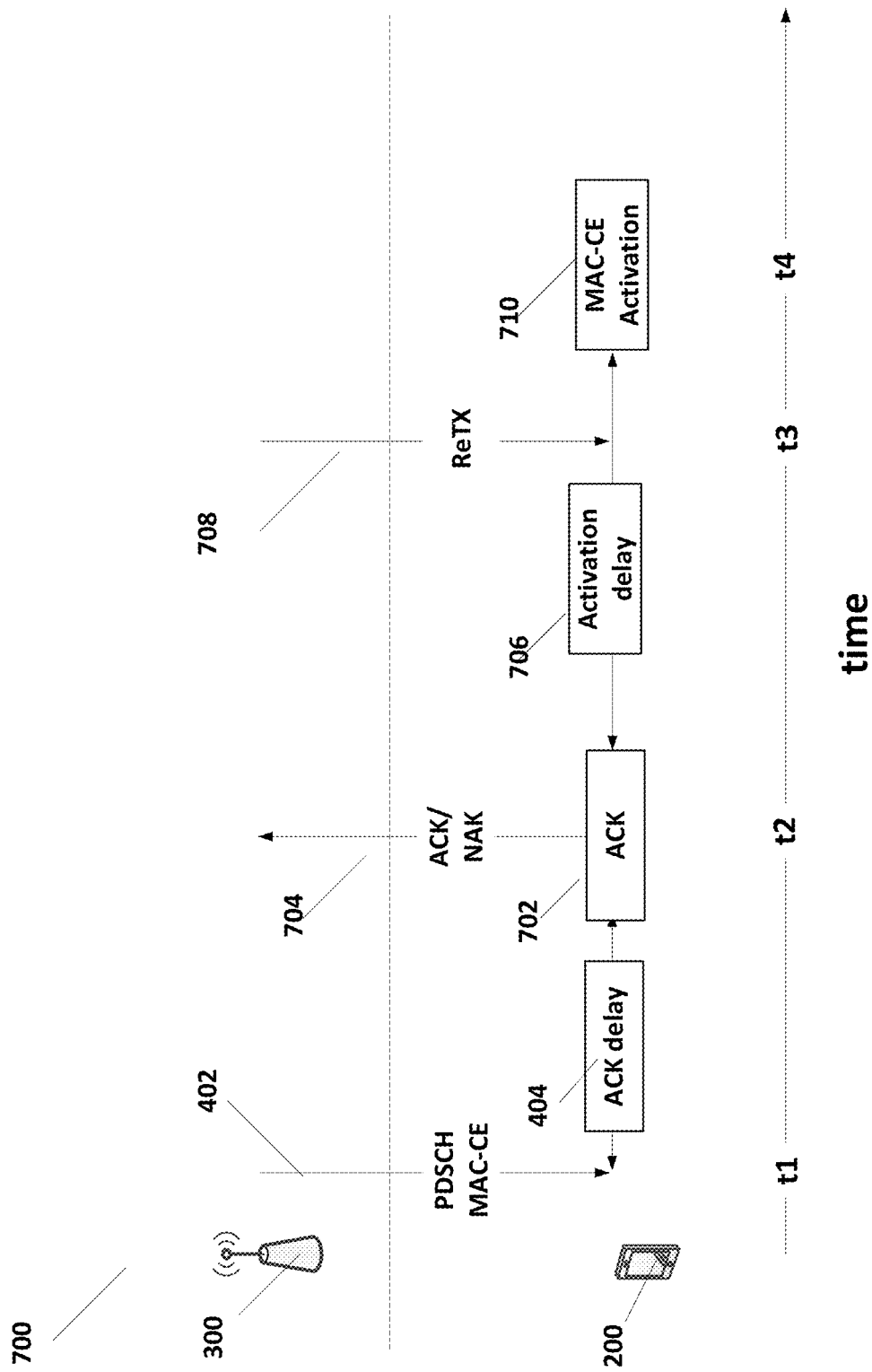
FIG. 7 illustrates another embodiment for timing execution of a MAC-CE instruction in a UE device.

FIG. 7 illustrates an embodiment where UE 200 apparently successfully provides the ACK communication at time t2, but a ReTX instruction 708 is received at time t3 prior to activation of the MAC-CE in MAC-CE activation 710. In these cases, UE 200 may have already begun activation of the MAC-CE and cannot stop that activation. Embodiments of the present invention may have several options for resolving this issue, of which timing sequence 700 as illustrated in FIG. 7 is one.

As illustrated in FIG. 7, UE 200 receives a PDSCH MAC-CE 402 at time t1. Reception of PDSCH MAC-CE 402 initiates an ACK delay 404. As discussed above, ACK delay 404 initiates a slot delay of n, where for multislot ACK processes (e.g., PUCCH or PUSCH slot-aggregation), n represents the last slot for transmission of ACK/NAK communication 704. In ACK step 702, UE 200 successfully transmits an ACK communications 704. After successfully transmitting ACK communications 704, UE 200 executes an activation delay 706 before activating the MAC-CE 710 in MAC-CE activation at time t4. In the example illustrated in FIG. 7, a ReTX instruction 708 is received at time t3 prior to time t4.

In the embodiment illustrated in FIG. 7, activation of the MAC-CE in MAC-CE activation 710 is based on the first apparently successful ACK communication 704 (a 'first transmission') in ACK step 702, regardless of whether a reTx instruction 708 is triggered or not. As illustrated in FIG. 7, an apparently successful transmission of ACK communication 704 occurs at time t2, however, a ReTX instruction 708 is received at an earlier time t3. However, activation of the MAC-CE is finished in MAC-CE activation 710 at time t4 regardless of receipt of the ReTX instruction 708. In some embodiments, UE 200 may respond to the ReTX instruction 708 by providing another ACK, but this does not affect the timing of activation of the MAC-CE instruction in MAC-CE activation 710. In this fashion, UE 200 does not change its activation plan once the plan has been initiated.

An apparently successful ACK transmission in ACK/NAK communication 704 can occur when there is no LBT failure and/or the threshold condition discussed above is met. As noted earlier, what constitutes a '1st transmission' for this purpose may depend on what (if any) portion of the transmission occasion was dropped due to LBT-failure.

Since the ReTX instruction 708 was to help gNB 300 to read the ACK/NAK communication 704, in the embodiment of timing process 700 of FIG. 7 gNB 300 may not get confirmation of actual MAC-CE activation. Again, as discussed above, large N used in activation delay 706 can mitigate this issue, but will not fully eliminate it. This approach is simpler from the viewpoint of UE 200 because UE 200 does not have to change its activation plans based on Ack retransmissions. However, in some more critical MAC-CE instructions, more sophisticated approaches may be warranted.

Figure 8:
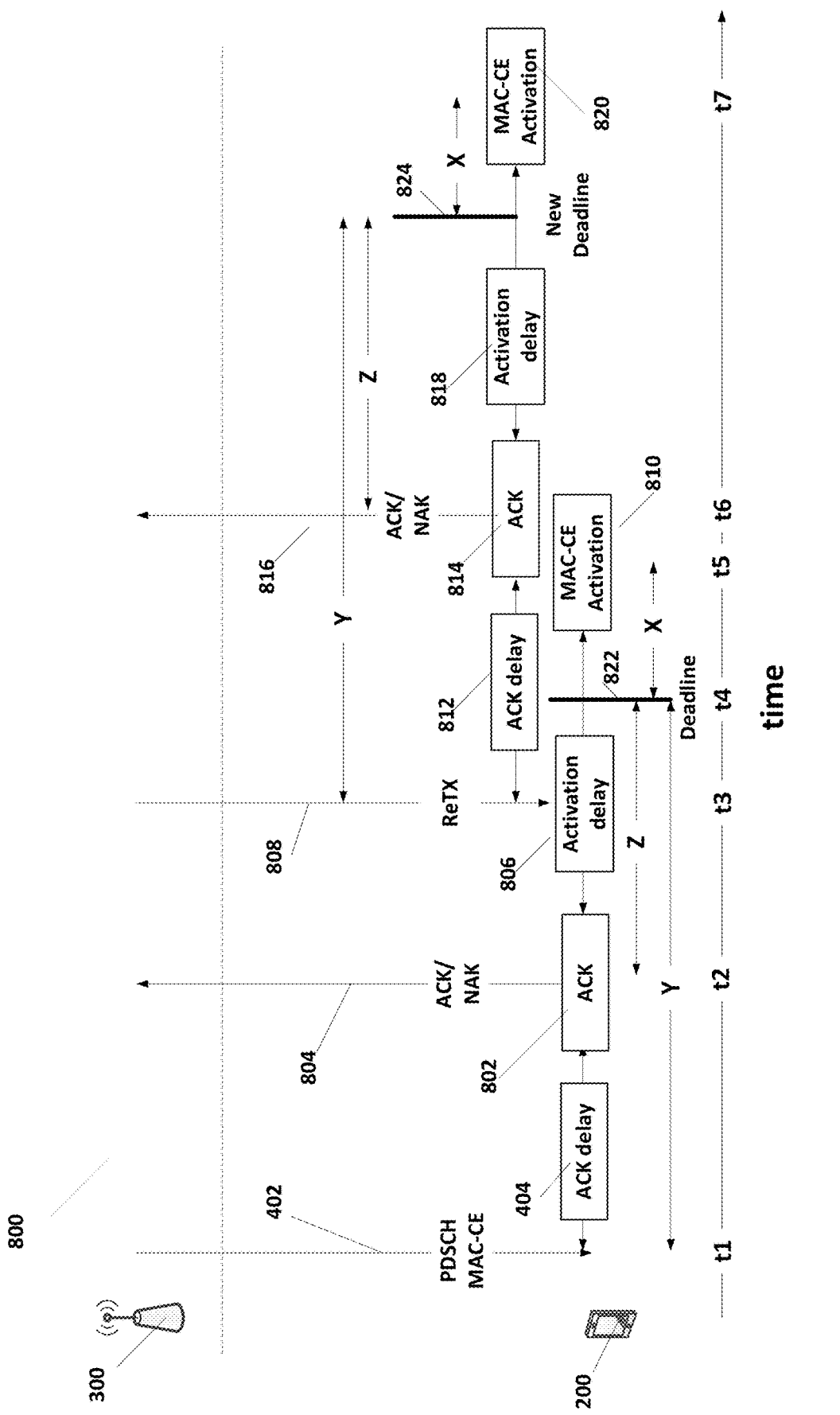
FIG. 8 illustrates another embodiment for timing execution of a MAC-CE instruction in a UE device.

FIG. 8 illustrates another embodiment with timing diagram 800, where the timing of activation of the MAC-CE in UE 200 is reset when a new ReTX arrives, provided the ReTX arrives within certain timing guidelines. Consequently, activation of the MAC-CE is based on the mth Ack (re)transmission ReTX instruction, for example the most recent one.

As illustrated in FIG. 8, a PDSCH MAC-CE communication 402 is received in UE 200 at time t1. After an ack delay 404, UE 200 sends an ACK/NAK communication 804 in ACK 802 at time t2. UE 200 would then activate the MAC-CE in MAC-CE activation 810 after an activation delay 806. However, as illustrated in FIG. 8, a ReTX communication 808 is received during activation delay 806. As discussed below, ReTX communication 808 is either ignored or results in resetting of the timing sequence depending on when ReTX 808 is received. If ReTX 808 is ignored, then UE 200 activates the MAC-CE instructions in MAC-CE activation 810 is performed at time t5. If the timing is reset, then a new ACK delay 812 is executed and, at time t6, an ACK/NAK communication 816 is transmitted by ACK 814. Further, after an activation delay 818, UE 200 activates the MAC-CE at time t7 in MAC-CE activation 820.

The first timing set resulting in activation of the MAC-CE in MAC-CE activation 810 at time t6 is based on the ACK/NAK communication 804 at time t2 from the initial receipt of the PDSCH with the MAC-CE instruction 402 at time t1. However, it is still an issue that reTX request 808 may arrive when it is too late for UE 200 to alter its planned MAC-CE activation in MAC-CE Activation 810. UE 200 does not know ahead of time whether a reTx will be requested or not. If it did, then it should be treated as non-contiguous slot aggregation (i.e., part of previous Ack), rather than as a separate Ack reTx.

Consequently, as is illustrated in the example timing sequence 800, a deadline 822 at time t4 for ReTX request 808 to arrive can be set, beyond which request 808 will not alter the current MAC-CE activation timing that results in activation at MAC-CE activation 810. As is further illustrated in FIG. 8, if the ReTX request, which arrives at time t3, is earlier than the deadline 822 at time t4, then the previously scheduled activation at time t5 is moved to time t7 with an ACK response at time t6. However, if the reTX arrives too late (i.e., t3>t4), then the MAC-CE activation 810 at time t5 is executed.

In some embodiments, the deadline can be defined as X slots prior to when UE 104 would have activated if based solely on previously arrived ReTX requests (or the original receipt of the PDSCH with the MAC-CE instruction). In that case, X>0.

In some embodiments, the deadline may be defined as Y slots after most recent Ack (re)Tx request. In that case Y>0. Timing of initial Ack Tx request may be based on timing of scheduling DL DCI or of PDSCH carrying MAC-CE.

In some embodiments, the deadline may be defined as Z slots after the end of the most recent ACK transmission, either ACK/NAK 804 or ACK/NAK 816 in the example illustrated in FIG. 8. Here Z<0 is possible, in case of multi-slot Ack, although in some embodiments this may be explicitly precluded, eg, with a rule that Ack reTx request must arrive only after the previous Ack has completed transmission. As is further illustrated FIG. 8, Y represents the time between receipt of PDSCH MAC-CE communication 402 and the deadline (deadline 822 or if redefined deadline 824) and X represents the time between the deadline (deadline 822 or if redefined deadline 824) and activation of the MAC-CE (in MAC-CE activation 810 or MAC-CE activation 820).

Combinations of the above deadline definitions can also be used. It should be noted that deadlines and other timings expressed in slots above are only as illustrative example. Other timing granularities (e.g., OFDM symbol, frame, etc) or absolute time units (milliseconds etc), both for the 'gap' (X,Y,Z) and for defining the event with respect to which the gap is defined (eg, either use the exact OFDM symbol in which the Ack TX ended, or use only the slot in which it ended, regardless of which symbol in the slot it ended in).

It should also be noted that ReTX requests may be allowed, even if the above deadline rules are not met. In that case, UE 300 will then re-send the Ack, but won't base MAC-CE activation on that retransmitted Ack. There may be a separate deadline for honoring ACK reTx request, eg, related with the deadline for keeping undecoded packets in a hybrid automatic repeat request (HARQ) buffer.

In another issue with regard to example timing sequence 800 illustrated in FIG. 8 is whether, in a multi-slot ACK situation, the reTX request 808 actually advance rather than further delay activation of the MAC-CE in UE 200. Activation time is based on the end of Ack transmission in communication 804 (i.e. the last slot of the ACK transmission). In the middle of a multi-slot Ack over M slots, UE 200 could receive a reTx request 808 for another multi-slot Ack over N<M slots, which could end earlier than the original ACK transmission 804. Even in a scenario in which block ACKs are single-slot, the 'k1 value' or gap between PDSCH and ACK (or between DCI and ACK, in case there is no associated PDSCH) may be smaller for the latter arriving ACK reTX request, resulting in the later requested ACK reTX ending earlier than the earlier requested one. Thus, switching to activation time based solely on that reTX request would advance the MAC-CE activation (i.e., in FIG. 8 t7<t5). In one solution to this problem, UE 200 may simply follow the timing dictated by the new reTX request 808 as long as it meets the deadline requirements discussed above.

However, another solution is that UE 104 use the timing from the latest ReTX request that meets the deadline requirements but does not advance the MAC-CE activation timing. In this case, using 'Y slots after most recent (re)tx request' definition of the deadline, UE 104 will only consider most recent ReTX request that delays the MAC-CE activation (i.e. t7>t5 in all circumstance).

A separate solution to the timing issue is to exclude the scenario altogether by implementing a rule that UE 104 does not expect and can ignore, or treat as false, CRC-pass on PDCCH decode, Ack ReTX requests that arrive while a previous Ack ReTX request has not yet completed fulfillment.

If multiple reTX requests are received 'at the same time' (eg, same slot) with different corresponding Ack ending times, UE 200 may follow the later-ending Ack, or other 'tie-breaker' criteria (eg, earlier OFDMsymbol within the slot, or lower PRB index, etc) may be implemented. Alternatively, this case may be excluded altogether—UE 200 doesn't expect it so it is undefined behavior, or specify that UE 200 ignores all the requests.

Another issue with the example timing sequence 800 illustrated in FIG. 8 is that UE 200 may miss the ACK reTX request 808 from gNB 300, even if it was sent by deadline 822 as described above. In this case, UE 200 activates MAC-CE in MAC CE activation 810 while gNB 300 thinks it has deferred this activation using the reTx request 808. As a solution to this problem, in some embodiments gNB 300 can discover this missed request. gNB 300, for example, can request via DCI or MAC-CE an ACK/NAK for that DCI or MAC-CE, which will reveal the missed request. A DAI mechanism can be used to discover missed DCIs, for DCI based request. gNB 300 may send a reTx request sufficiently in advance so that it can discover this by the time UE 200 activates MAC-CE, provided sufficient time is provided.

The methods described herein apply to any situation where UE 200 may not transmit some scheduled Acks. LBT failure is an example of this failure. Other examples can include pre-emption by more urgent (UL or DL) traffic, or skipping of Ack transmission due to insufficient UL OFDM symbols in the scheduled slot. It should be noted that different behavior may apply depending on whether gNB 300 knows of (eg, gNB 300 caused) the pre-emption. For example, the threshold described for determining a successful ACK described above may be different based on this. gNB 300 may not be aware of pre-emption if it is due to UE 200 having to transmit on a different SIM (in dual-SIM UEs), to a different TRP, sidelink UE, etc.

An Ack reTx request may be configured even in licensed operation, not necessarily only in unlicensed NR-U. The same ideas apply as described above. If gNB 300 has an ACK→NAK error and schedules a HARQ retransmission accordingly, the Ack for that HARQ retransmission may be interpreted by UE 200 as an Ack retransmission and processed using rules described herein.

In the above discussion, examples are illustrated where the 1st Ack transmission is triggered by DCI scheduling the PDSCH being ACKed, and subsequent ACK reTx communications are triggered by later DCI. However, the scheduling DCI may also not trigger any ACK. The later DCI may trigger the first ACK Tx. The same concepts apply; timelines are based on that later DCI treated as the 1st Ack-triggering DCI. Timelines may then not be based on receipt of a PDSCH, because the later DCI may not even be associated with any PDSCH. It may also be noted that the same or different rules, or the same or different parameter values (such as threshold values) relevant to a particular rule, may be applied for different types of MAC-CEs. Also, although the operations above are described based on MAC-CEs and ACK/NACK reTX requests being sent by a base station 300 to a UE 200, similar behavior could apply even if these are being sent by a sidelink UE to UE 200.

In some embodiments, after receiving a packet with a HARQ-ID, UE 200 does not expect another transmission on the same HARQ-ID until it has completed transmitting an ACK/NAK. With a multi-slot ACK, gNB 300 may decode the ACK/NAK early, so there may not be a need to wait for the entire ACK to be received at gNB 300 before sending a second transmission. In extreme cases, gNB 300 may pre-emptively guess the ACK/NAK transmission status from UE 200 before UE 200 has even begun transmitting. The NDI field on a second transmission on the same HARQ-ID indicates if it is a retransmission or a new packet. If UE 200 is expecting a retransmission but receives a new packet, it either (a) ignores the previous packet or (b) ignores the NDI field and processes as a retransmission. If UE 200 is expecting a new packet but receives a retransmission, UE 200 may ignore the retransmission as it has already decoded the packet. ACK/NAK transmission based on the PDSCH may be continued or aborted. This may depend on whether the ACK/NAK transmission had begun or not.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of operating a user equipment (UE) device, comprising:
    receiving a transmission from a base station that includes instructions for performing an action;
    attempting an ACK based on the transmission;
    timing performance of the action dependent on whether the ACK is successfully transmitted; and
    performing the action according to the timing,
    wherein a portion of the scheduled Ack transmission duration is omitted, the portion ranging from none to all of the ACK transmission, and timing the action is adjusted based on this ACK transmission is dependent on the portion omitted falling below a threshold value.

2. The method of claim 1, wherein timing performance of the action is based on the attempted or actual transmission of the ACK, receipt of the transmission, or receipt of a retransmission request.

3. The method of claim 1, wherein the action is activation of a MAC-CE instruction.

4. The method of claim 1, wherein timing the action includes basing the timing on previous ACK transmissions or ACK retransmissions.

5. The method of claim 1, wherein attempting an ACK results in an ACK transmission and timing the action is based on the time of the first ACK transmission.

6. The method of claim 1, wherein timing the action is based on the most recent receipt of a retransmission request.

7. The method of claim 1, wherein timing the action is based on the most recent receipt of a retransmission request that obeys a timing deadline, the timing deadline based on a previous timing.

8. The method of claim 7, wherein the timing deadline is defined by one of a set time to completion of the action, a set time from completion of an ACK request, and a set time from receipt of the transmission request or receipt of the last retransmission request.

9. The method of claim 1, wherein the omitted portion is due to one or more of LBT failure, pre-emption, or insufficient uplink OFDMsymbols for transmission.

10. The method of claim 1, wherein the threshold depends on whether the base station is aware of the omission.

11. The method of 1 wherein the omitted portion represents a fixed number of slots or OFDMsymbols, or a fraction or percentage of the scheduled number of slots or OFDMsymbols.

12. The method of claim 1, further including receiving an Ack ReTX request, the ACK ReTX request being expected only after a previous Ack transmission is completed.

13. The method of claim 1, wherein an Ack ReTX request is not expected after a deadline related to a deadline for storing an undecoded packet in a HARQ buffer.

14. A method of operating a user equipment (UE) device, comprising:
    receiving a transmission from a base station that includes instructions for performing an action;
    attempting an ACK based on the transmission;
    timing performance of the action dependent on whether the ACK is successfully transmitted, wherein timing the action is based on the most recent receipt of a retransmission request that obeys a timing deadline, the timing deadline based on a previous timing;
    performing the action according to the timing; and
    further including receiving an ACK ReTX request and wherein the Ack ReTX request delays performing the action.

15. A method of operating a user equipment (UE) device, comprising:
    receiving a transmission from a base station that includes instructions for performing an action;
    attempting an ACK based on the transmission;
    timing performance of the action dependent on whether the ACK is successfully transmitted, wherein timing the action is based on the most recent receipt of a retransmission request that obeys a timing deadline, the timing deadline based on a previous timing; performing the action according to the timing; and
    further including receiving an ACK ReTX request and wherein performing the action is delayed or advanced.

16. A user equipment device, comprising:
    a transceiver;
    a communications module coupled to the transceiver to receive and transmit communications to a base station, the communications module executing instructions to
    receive a transmission from a base station that includes instructions for performing an action;
    attempt an ACK based on the transmission;
    time performance of the action dependent on whether the ACK is successfully transmitted; and
    perform the action according to the timing,
    wherein a portion of the scheduled Ack transmission duration is omitted, the portion ranging from none to all of the ACK transmission, and timing the action is adjusted based on this ACK transmission is dependent on the portion omitted falling below a threshold value.

17. The user equipment device of claim 16, wherein performance of the action is timed based on the transmission of the ACK, receipt of the transmission, or receipt of a retransmission request.

18. The user equipment of claim 16, wherein action is activation of a MAC-CE instruction.

19. The user equipment of claim 16, wherein timing the action is based on the most recent receipt of a retransmission request that obeys a timing deadline, the timing deadline based on a previous timing.

20. The user equipment of claim 19, wherein the timing deadline is defined by one of a set time to completion of the action, a set time from completion of an ACK request, and a set time from receipt of the transmission request or receipt of the last reTX request.

21. A user equipment device, comprising:
    means for receiving and transmitting communications to a base station;
    means for receiving instruction communications from the base station;

means for timing execution of the instruction communications based on whether an ACK transmission is successful, wherein a portion of a scheduled Ack transmission duration is omitted, the portion ranging from none to all of the ACK transmission, and means for timing execution is adjusted based on this ACK transmission is dependent on the portion omitted falling below a threshold value.

\* \* \* \* \*